US012438262B2

(12) United States Patent
Kunugita et al.

(10) Patent No.: US 12,438,262 B2
(45) Date of Patent: Oct. 7, 2025

(54) ANTENNA SUBSTRATE AND ANTENNA DEVICE

(71) Applicant: KABUSHIKI KAISHA TOKAI RIKA DENKI SEISAKUSHO, Aichi (JP)

(72) Inventors: Masaki Kunugita, Aichi (JP); Kosuke Taki, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 86 days.

(21) Appl. No.: 18/421,325

(22) Filed: Jan. 24, 2024

(65) Prior Publication Data

US 2024/0258688 A1 Aug. 1, 2024

(30) Foreign Application Priority Data

Jan. 30, 2023 (JP) ................................ 2023-011696

(51) Int. Cl.

*H01Q 7/06* (2006.01)
*H01Q 1/38* (2006.01)
*H01Q 7/00* (2006.01)

(52) U.S. Cl.

CPC ................ *H01Q 1/38* (2013.01); *H01Q 7/00* (2013.01)

(58) Field of Classification Search

CPC .. H01Q 1/38; H01Q 7/00; H01Q 1/24; H01Q 7/06

See application file for complete search history.

(56) References Cited

U.S. PATENT DOCUMENTS

2017/0345535 A1* 11/2017 Kim .......................... H01F 1/26
2022/0393354 A1* 12/2022 Ito ........................... H02J 50/10
2023/0091874 A1* 3/2023 Choi ...................... H01Q 21/30
343/867

FOREIGN PATENT DOCUMENTS

JP 2020-145565 A 9/2020

* cited by examiner

*Primary Examiner* — David E Lotter

(74) *Attorney, Agent, or Firm* — Greenblum & Bernstein, P.L.C.

(57) ABSTRACT

An antenna substrate includes a substrate including a first main surface and a second main surface, and a coil including a first portion supported on the first main surface, and a second portion supported on the second main surface. A communicating portion is formed in the substrate. The communicating portion communicates the first main surface with the second main surface. The first portion and the second portion are electrically connected to each other, through the communicating portion. A winding direction of the first portion and a winding direction of the second portion are identical, when viewed from a direction along a normal line of the first main surface or a normal line of the second main surface.

10 Claims, 6 Drawing Sheets

ANTENNA SUBSTRATE AND ANTENNA DEVICE

CROSS-REFERENCE TO RELATED APPLICATIONS

This application is based on and claims priority under 35 USC 119 from Japanese Patent Application No. 2023-011696 filed on Jan. 30, 2023, the entire content of which is incorporated herein by reference.

TECHNICAL FIELD

The present disclosure relates to an antenna substrate and an antenna device.

BACKGROUND ART

An antenna device disclosed in JP2020-145565A includes a substrate on which a coil is mounted. Power is supplied to the coil, and the coil operates as an antenna.

It is required to improve antenna characteristics while preventing an increase in the mounting area of a coil functioning as an antenna onto a substrate.

SUMMARY OF INVENTION

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an antenna substrate including:

- a substrate including a first main surface and a second main surface; and
- a coil including:
  - a first portion supported on the first main surface; and
  - a second portion supported on the second main surface,
- in which a communicating portion is formed in the substrate, the communicating portion communicating the first main surface with the second main surface,
- in which the first portion and the second portion are electrically connected to each other, through the communicating portion, and
- in which a winding direction of the first portion and a winding direction of the second portion are identical, when viewed from a direction along a normal line of the first main surface or a normal line of the second main surface.

BRIEF DESCRIPTION OF DRAWINGS

Exemplary embodiment(s) of the present invention will be described in detail based on the following figures, wherein.

DESCRIPTION OF EMBODIMENTS

Figure 1:
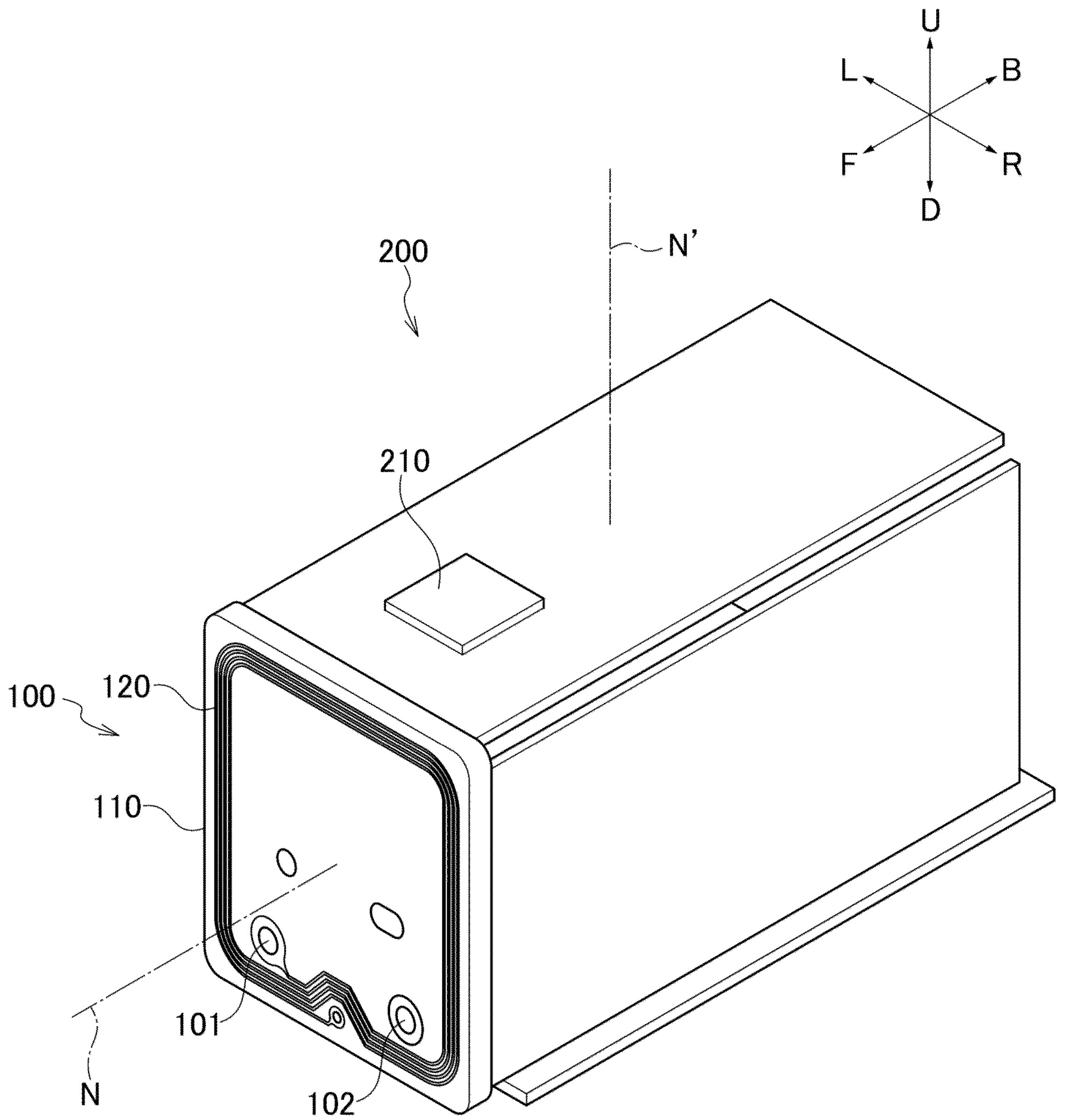
FIG. 1 illustrates an antenna device according to an embodiment.

An embodiment will be described in detail with reference to the accompanying drawings. In the drawings used in the following description, the scale is appropriately changed in order to make illustrated elements recognizable in size.

In the accompanying drawings, an arrow F indicates a front direction of an illustrated structure. An arrow B indicates a rear direction of the illustrated structure. An arrow U indicates an upper direction of the illustrated structure. An arrow D indicates a lower direction of the illustrated structure. An arrow R indicates a right direction of the illustrated structure. An arrow L indicates a left direction of the illustrated structure. The expressions related to the directions are intended to be used for convenience of description, and are not intended to limit the posture of the structure in actual use.

FIG. 1 illustrates an antenna device 1 according to an embodiment. The antenna device 1 includes an antenna substrate 100 and a control substrate 200.

The antenna substrate 100 includes a substrate 110. The substrate 110 is made of an electrically insulating material. The substrate 110 includes a first terminal 101 and a second terminal 102. The first terminal 101 and the second terminal 102 are made of a conductive material.

The antenna substrate 100 includes a coil 120. The coil 120 is implemented as a planar coil by forming, on the substrate 110, a winding pattern using a conductive material. The coil 120 is electrically connected to the first terminal 101 and the second terminal 102.

The control substrate 200 includes a controller 210. The controller 210 is electrically connected to the first terminal 101 and the second terminal 102 of the antenna substrate 100. The controller 210 includes a circuit for controlling power supplied to the coil 120 through the first terminal 101 and the second terminal 102. The coil 120 operates as a planar antenna, when power is supplied.

Figure 2:
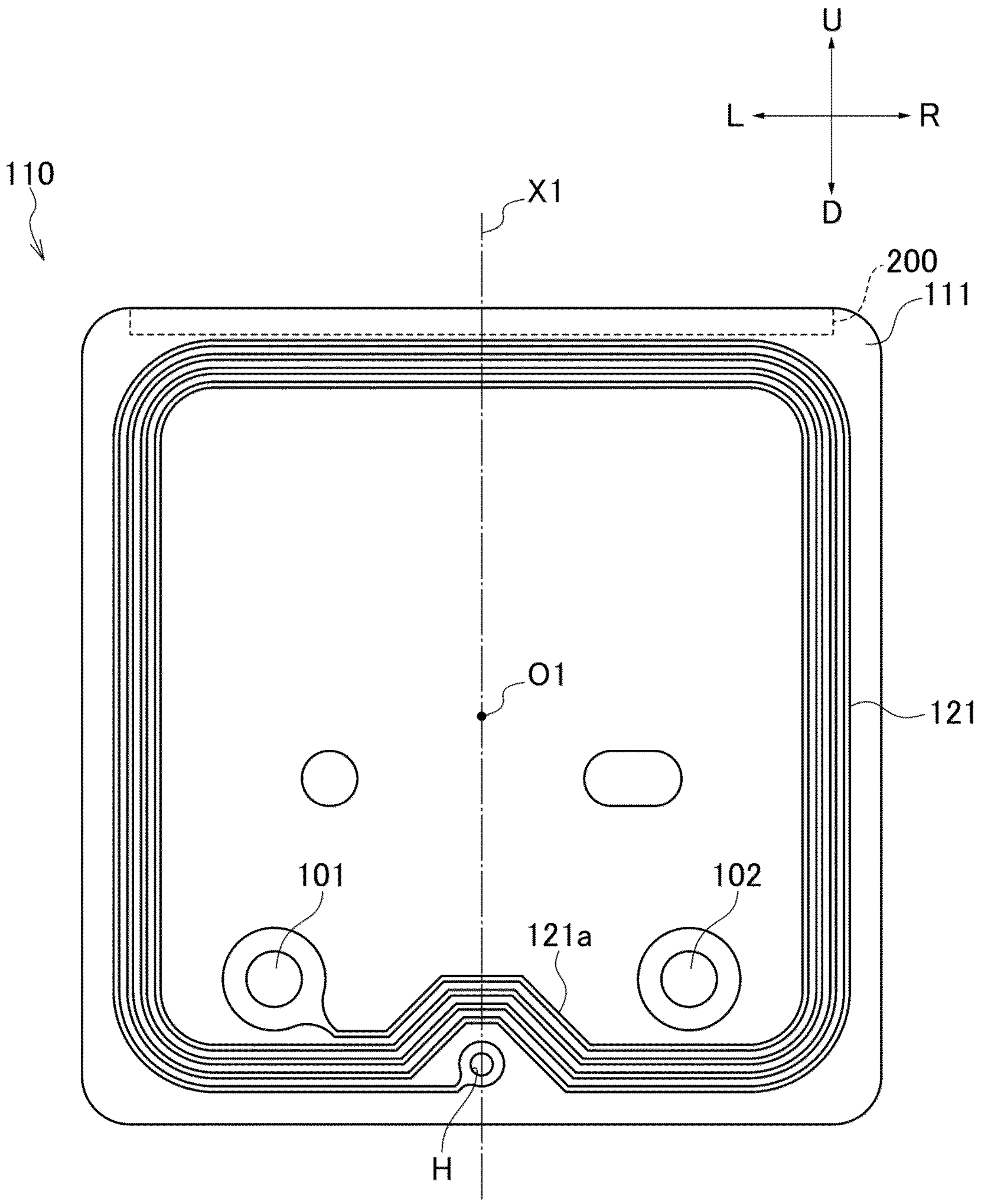
FIG. 2 illustrates a configuration of a first main surface of an antenna substrate according to the embodiment.
Figure 3:
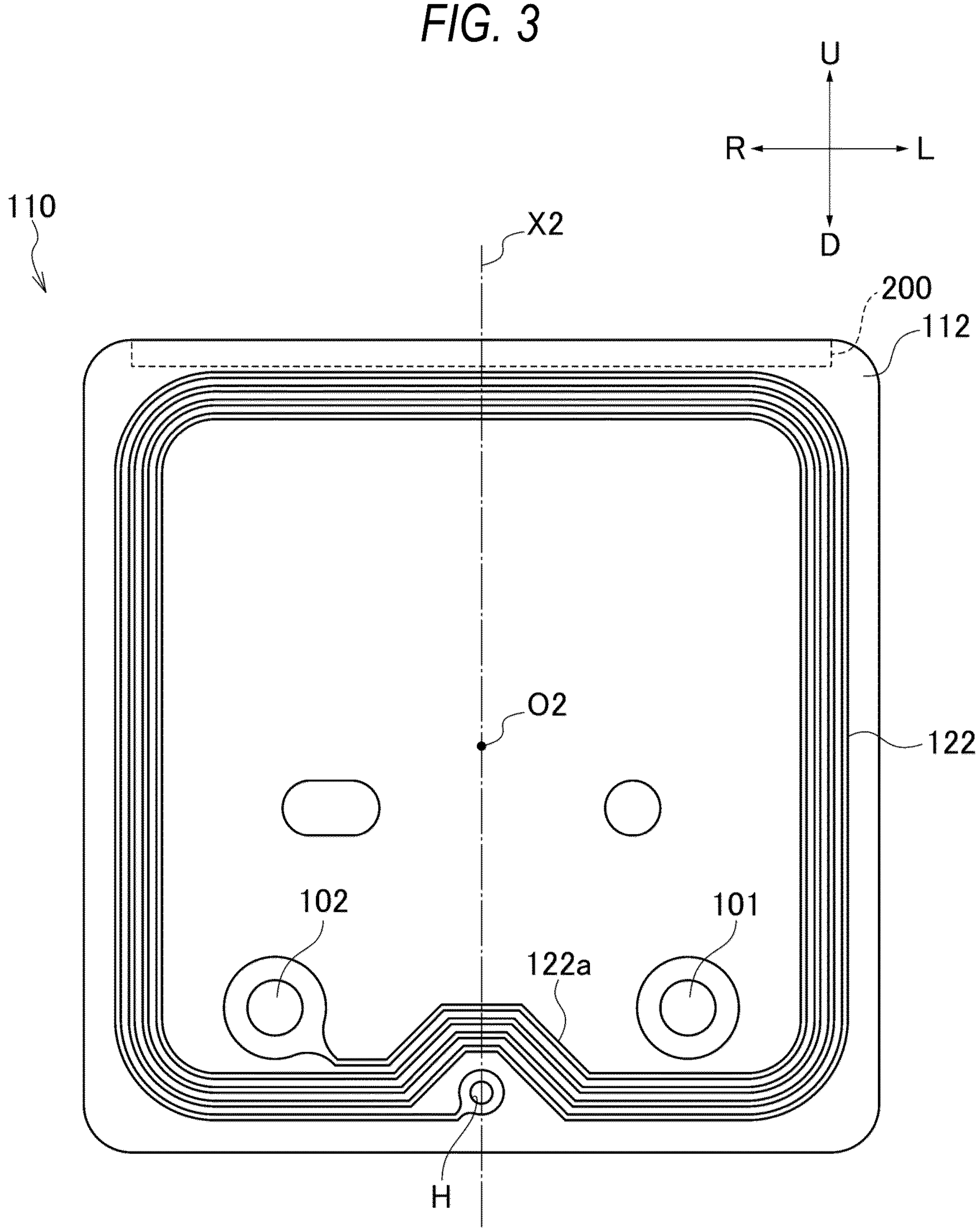
FIG. 3 illustrates a configuration of a second main surface of the antenna substrate according to the embodiment.

As illustrated in FIGS. 2 and 3, the substrate 110 includes a first main surface 111 and a second main surface 112. The term "main surface of the substrate" used in the present specification means a surface having the largest area on the substrate. In this example, the first main surface 111 and the second main surface 112 face opposite directions.

A through hole H is formed in the substrate 110. The through hole H communicates the first main surface 111 with the second main surface 112. The through hole H is an example of a communicating portion. A conductive layer is formed on an inner peripheral wall of the through hole H and around the through hole H on each main surface.

As illustrated in FIG. 2, the coil 120 includes a first portion 121. The first portion 121 is supported on the first main surface 111. One end of the first portion 121 is electrically connected to the first terminal 101. The other end of the first portion 121 is electrically connected to the conductive layer formed around the through hole H.

As illustrated in FIG. 3, the coil 120 includes a second portion 122. The second portion 122 is supported on the second main surface 112. One end of the second portion 122 is electrically connected to the second terminal 102. The other end of the second portion 122 is electrically connected to the conductive layer formed around the through hole H.

Therefore, the first portion 121 and the second portion 122 are electrically connected to each other, through the through hole H.

As illustrated in FIG. 2, the first portion 121 is formed by a conductive pattern wound counterclockwise. On the other hand, as illustrated in FIG. 3, the second portion 122 is formed by a conductive pattern wound clockwise. That is, when viewed from a direction along the normal line of either main surface, a winding direction of the first portion 121 and a winding direction of the second portion 122 are identical. Therefore, a direction of a magnetic field generated by the power supply to the first portion 121, and a direction of a magnetic field generated by the electrode supply to the second portion 122 coincide with each other.

The antenna characteristics are improved by increasing the inductance of the coil. In order to increase the inductance, it is sufficient to increase at least one of the cross-sectional area or the winding number of the coil. The term "cross-sectional area of the coil" used in the present specification means the area of a region located inside a winding pattern.

On the other hand, from the viewpoint of preventing an increase in size of the antenna device, it is required to reduce the area of the antenna substrate. The reduction of the area of the antenna substrate means reduction of the mounting area of the coil onto the antenna substrate. That is, it is difficult to increase at least one of the cross-sectional area or the winding number of the coil.

According to the configuration in the present embodiment, the coil 120 is divided into the first portion 121 and the second portion 122, and the first portion 121 and the second portion 122 are placed on the first main surface 111 and the second main surface 112 of the substrate 110, respectively. Therefore, the cross-sectional area and the winding number of the coil can be kept from being reduced on each of the first main surface 111 and the second main surface 112.

As an example, it is possible to increase the winding number of the coil 120 while maintaining at least one of the area of the substrate 110 or the cross-sectional area of the coil 120. As another example, it is possible to reduce at least one of the area of the substrate 110 or the cross-sectional area of the coil 120 while maintaining the winding number of the coil 120. As a result, it is possible to improve the antenna characteristics while preventing an increase in the mounting area of the coil 120 functioning as an antenna onto the substrate 110.

Furthermore, it is possible to reduce an increase in size of the antenna device 1 including the antenna substrate 100 implemented as described above.

As illustrated in FIG. 1, in the antenna device 1, a normal line N of the antenna substrate 100 and a normal line N' of the control substrate 200 extend non-parallel. In this example, a direction of the normal line N of the antenna substrate 100 coincides with a direction of the normal line of each of the first main surface 111 and the second main surface 112 of the substrate 110.

As illustrated in FIG. 2, the control substrate 200 does not overlap the first portion 121 of the coil 120, when viewed from a direction along the normal line N of the antenna substrate 100. In this case, the influence of the control substrate 200 on the magnetic field formed by the power supply to the first portion 121 can be reduced.

As illustrated in FIG. 3, the control substrate 200 does not overlap the second portion 122 of the coil 120, when viewed from the direction along the normal line N of the antenna substrate 100. In this case, the influence of the control substrate 200 on the magnetic field formed by the power supply to the second portion 122 can be reduced.

If the influence of the control substrate 200 can be substantially ignored, the arrangement of the control substrate 200 can be determined such that at least a part of the control substrate 200 does not overlap at least one of the first portion 121 or the second portion 122, when viewed from the direction along the normal line N of the antenna substrate 100.

As described above, in the present embodiment, the first portion 121 and the second portion 122 of the coil 120 in the antenna substrate 100 are electrically connected to each other through the through hole H. In this case, since a location where electrical connection is secured is more flexible, the degree of freedom regarding the layout of the coil 120 can be increased.

However, the first portion 121 and the second portion 122 may be electrically connected to each other, through a notch or a groove formed in a peripheral portion of the substrate 110. In this case, the notch or the groove is an example of a communicating portion.

As illustrated in FIG. 2, the first portion 121 of the coil 120 is wound to extend along the periphery of the first main surface 111 in the substrate 110. The first portion 121 includes a detour portion **121*a*. The detour portion 121*a* detours around the through hole H to be away from the periphery of the substrate 110**.

According to such a configuration, in particular, in a case where the first portion 121 and the second portion 122 are electrically connected through the through hole H, a portion of the first portion 121 other than the detour portion **121*a* can be provided near the periphery of the substrate 110. Therefore, it is possible to reduce a decrease in the cross-sectional area of the first portion 121**.

As illustrated in FIG. 3, the second portion 122 of the coil 120 is wound to extend along the periphery of the second main surface 112 in the substrate 110. The second portion 122 includes a detour portion **122*a*. The detour portion 122*a* detours around the through hole H to be away from the periphery of the substrate 110**.

According to such a configuration, in particular, in a case where the first portion 121 and the second portion 122 are electrically connected through the through hole H, a portion of the second portion 122 other than the detour portion **122*a* can be provided near the periphery of the substrate 110. Therefore, it is possible to reduce a decrease in the cross-sectional area of the second portion 122**.

In order to detour around the through hole H, both the first portion 121 and the second portion 122 do not need to include a detour portion. A configuration may also be used in which at least one of the first portion 121 or the second portion 122 includes a detour portion.

As illustrated in FIG. 2, the first portion 121 of the coil 120 has a substantially line-symmetric shape with respect to a symmetry axis X1. In this case, it becomes easy to bring symmetry to the distribution of the magnetic field formed by the power supply to the first portion 121.

As illustrated in FIG. 3, the second portion 122 of the coil 120 has a substantially line-symmetric shape with respect to a symmetry axis X2. In this case, it becomes easy to bring symmetry to the distribution of the magnetic field formed by the power supply to the second portion 122.

The term "substantially symmetric shape" used in the present specification does not require a strictly symmetric shape, but is meant to allow asymmetry to the extent that the asymmetry does not affect the desired symmetry in the distribution of the magnetic field.

As illustrated in FIG. 2, the through hole H is formed on the symmetry axis X1 that defines the symmetry of the shape of the first portion 121. In this case, the presence of the through hole H facilitates maintaining the substantial symmetry in the shape of the first portion 121.

As illustrated in FIG. 3, the through hole H is formed on the symmetry axis X2 that defines the symmetry of the shape of the second portion 122. In this case, the presence of the through hole H facilitates maintaining the substantial symmetry in the shape of the second portion 122.

In the present embodiment, the coil 120 is implemented such that the cross-sectional area of the first portion 121 is equal to the cross-sectional area of the second portion 122.

According to such a configuration, it becomes easy to bring symmetry to the distribution of the magnetic field formed by the power supply to the coil 120.

A sign O1 illustrated in FIG. 2 indicates the center of the first portion 121. The center O1 corresponds to the center of a circle circumscribing the first portion 121. A sign O2 illustrated in FIG. 3 indicates the center of the second portion 122. The center O2 corresponds to the center of a circle circumscribing the second portion 122.

According to such a configuration, it also becomes easy to bring symmetry to the distribution of the magnetic field formed by the power supply to the coil 120.

The coil 120 may be implemented such that the first portion 121 and the second portion 122 are different in at least one of shape, size, or center position. The shape, size, and center position may be changed such that the cross-sectional area is changed, or the cross-sectional area may be maintained.

Figure 4:
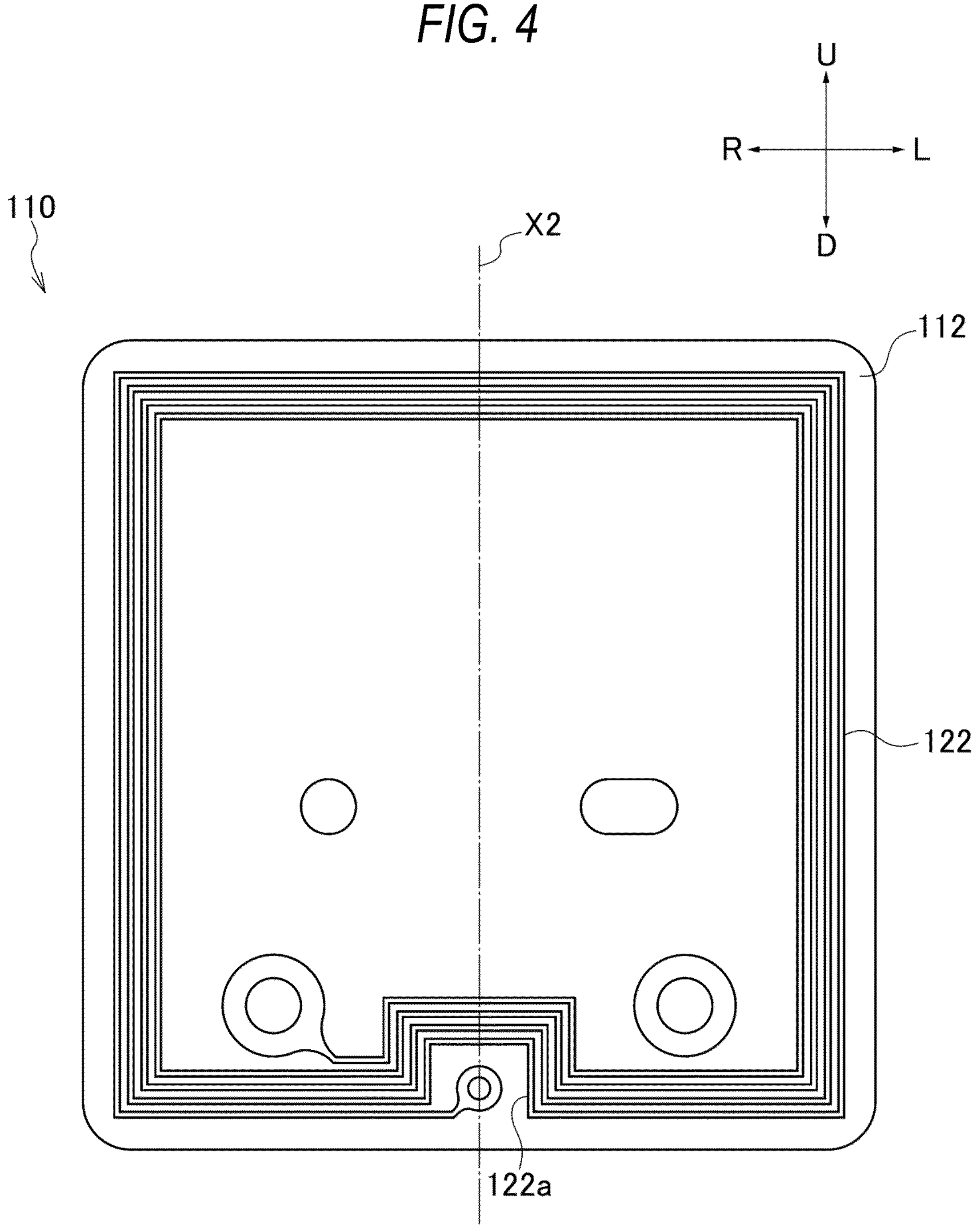
FIG. 4 shows another example of the configuration of the second main surface.

As an example, while the configuration of the first portion 121 remains unchanged, the shape of the second portion 122 may be changed as illustrated in FIG. 4. In the example illustrated in FIG. 4, the shape of the detour portion 122*a* is changed from the example illustrated in FIG. 3. As a result, the shape of the first portion 121 and the shape of the second portion 122 are different. Although not illustrated, the winding number may be changed. The change in the winding number is also an example of the change in the shape.

Figure 5:
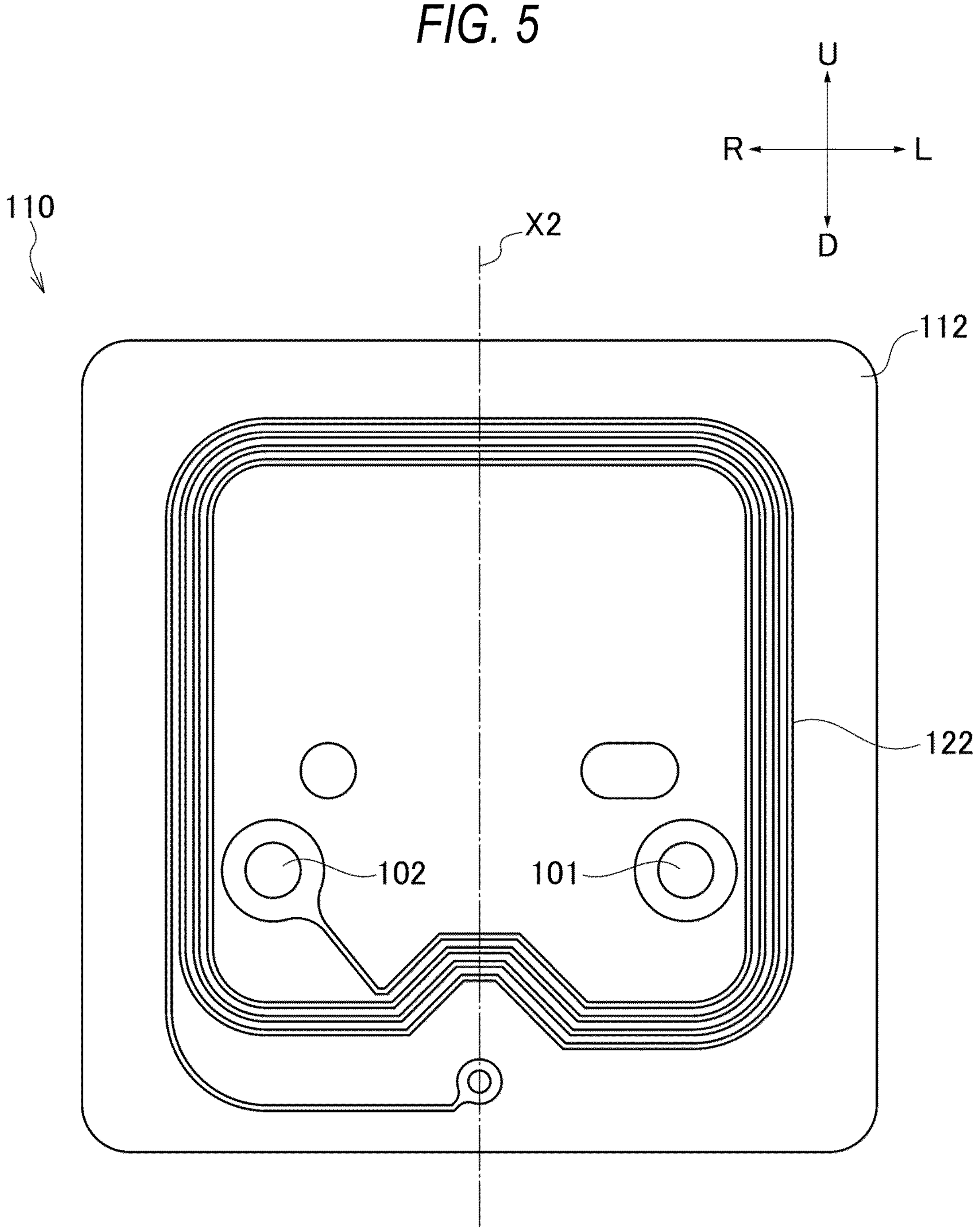
FIG. 5 shows another example of the configuration of the second main surface.

As another example, while the configuration of the first portion 121 remains unchanged, the size of the second portion 122 may be changed as illustrated in FIG. 5. In the example illustrated in FIG. 5, while the shape of the second portion 122 is maintained, only the size is changed from the example illustrated in FIG. 3. As a result, the size of the first portion 121 and the size of the second portion 122 are different.

Figure 6:
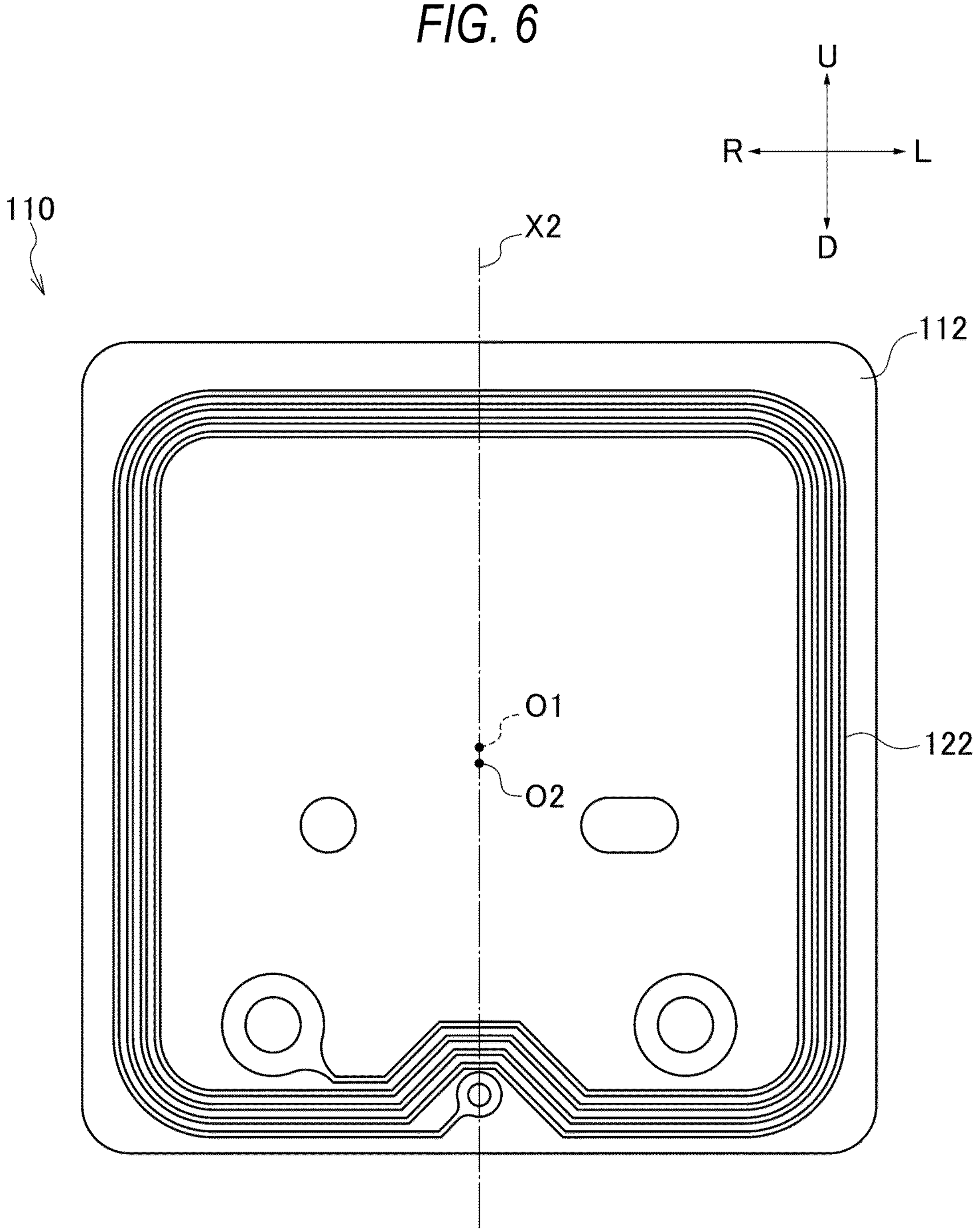
FIG. 6 shows another example of the configuration of the second main surface.

As another example, while the configuration of the first portion 121 remains unchanged, the position of the center O2 of the second portion 122 may be changed as illustrated in FIG. 6. In the example illustrated in FIG. 6, while the shape and the size of the second portion 122 are maintained, only the position of the center is changed from the example illustrated in FIG. 3. As a result, the position of the center of the first portion 121 and the position of the center of the second portion 122 are different.

According to such a configuration, the distribution of the magnetic field formed by the power supply to the first portion 121 and the distribution of the magnetic field formed by the power supply to the second portion 122 can be actively different. That is, the coil 120 can be divided into the first portion 121 and the second portion 122, and the design of the first portion 121 and the second portion 122 can be individually changed. Therefore, it is possible to easily perform fine adjustments to the antenna characteristics according to the specifications required of the antenna device 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

In the substrate 110 of the antenna substrate 100, at least a part of the portion located inside the winding pattern of the coil 120 may be a void.

The configurations listed below also constitute a part of the present disclosure.

(1) An antenna substrate including:
a substrate including a first main surface and a second main surface; and
a coil including:
a first portion supported on the first main surface; and
a second portion supported on the second main surface,
in which a communicating portion is formed in the substrate, the communicating portion communicating the first main surface with the second main surface,
in which the first portion and the second portion are electrically connected to each other, through the communicating portion, and
in which a winding direction of the first portion and a winding direction of the second portion are identical, when viewed from a direction along a normal line of the first main surface or a normal line of the second main surface.

(2) The antenna substrate according to (1),
in which the communicating portion is a through hole.

(3) The antenna substrate according to (1) or (2),
in which at least one of the first portion or the second portion includes a detour portion that detours around the communicating portion to be away from a periphery of the substrate.

(4) The antenna substrate according to any one of (1) to (3),
in which a shape of at least one of the first portion or the second portion has symmetry.

(5) The antenna substrate according to (4),
in which the communicating portion is formed on a symmetry axis line defined based on the symmetry.

(6) The antenna substrate according to (1) to (5),
in which a cross-sectional area of the first portion is equal to a cross-sectional area of the second portion.

(7) The antenna substrate according to (1) to (6),
In which a center of the first portion and a center of the second portion coincide with each other, when viewed from the direction along a normal line of the first main surface or a normal line of the second main surface.

(8) The antenna substrate according to (1) to (7),
in which the first portion and the second portion are different in at least one of shape, size, or center position.

(9) An antenna device including:
the antenna substrate according to any one of (1) to (8);

a control substrate configured to support a controller configured to control the coil; and a housing configured to support the antenna substrate and the control substrate.

(10) The antenna device according to (9), in which a normal line of the antenna substrate and a normal line of the control substrate are not parallel to each other, and in which the control substrate is provided at a position that does not overlap at least one of the first portion and the second portion, when viewed from a direction along the normal line of the antenna substrate.

What is claimed is:

1. An antenna substrate comprising:

a substrate including a first main surface and a second main surface; and a coil including:

a first portion supported on the first main surface; and a second portion supported on the second main surface, wherein a single communicating portion is formed in the substrate, the communicating portion communicating the first main surface with the second main surface, wherein the first portion and the second portion are electrically connected to each other in series, through the communicating portion, and wherein a winding direction of the first portion and a winding direction of the second portion are identical, when viewed from a direction along a normal line of the first main surface or a normal line of the second main surface.

2. The antenna substrate according to claim 1, wherein the communicating portion is a through hole.

3. The antenna substrate according to claim 1, wherein at least one of the first portion or the second portion includes a detour portion that detours around the communicating portion to be away from a periphery of the substrate.

4. The antenna substrate according to claim 1, wherein a shape of at least one of the first portion or the second portion has symmetry.

5. The antenna substrate according to claim 4, wherein the communicating portion is formed on a symmetry axis line defined based on the symmetry.

6. The antenna substrate according to claim 1, wherein a cross-sectional area of the first portion is equal to a cross-sectional area of the second portion.

7. The antenna substrate according to claim 1, wherein a center of the first portion and a center of the second portion coincide with each other, when viewed from the direction along a normal line of the first main surface or a normal line of the second main surface.

8. The antenna substrate according to claim 1, wherein the first portion and the second portion are different in at least one of shape, size, or center position.

9. An antenna device comprising:

the antenna substrate according to claim 1;

a control substrate configured to support a controller configured to control the coil; and a housing configured to support the antenna substrate and the control substrate.

10. The antenna device according to claim 9, wherein a normal line of the antenna substrate and a normal line of the control substrate are not parallel to each other, and wherein the control substrate is provided at a position that does not overlap at least one of the first portion or the second portion, when viewed from a direction along the normal line of the antenna substrate.

* * * * *